Aug. 30, 1938.    L. F. WOODRUFF    2,128,446
DEVICE FOR DECODING RECORDS
Filed Aug. 3, 1937    5 Sheets-Sheet 3

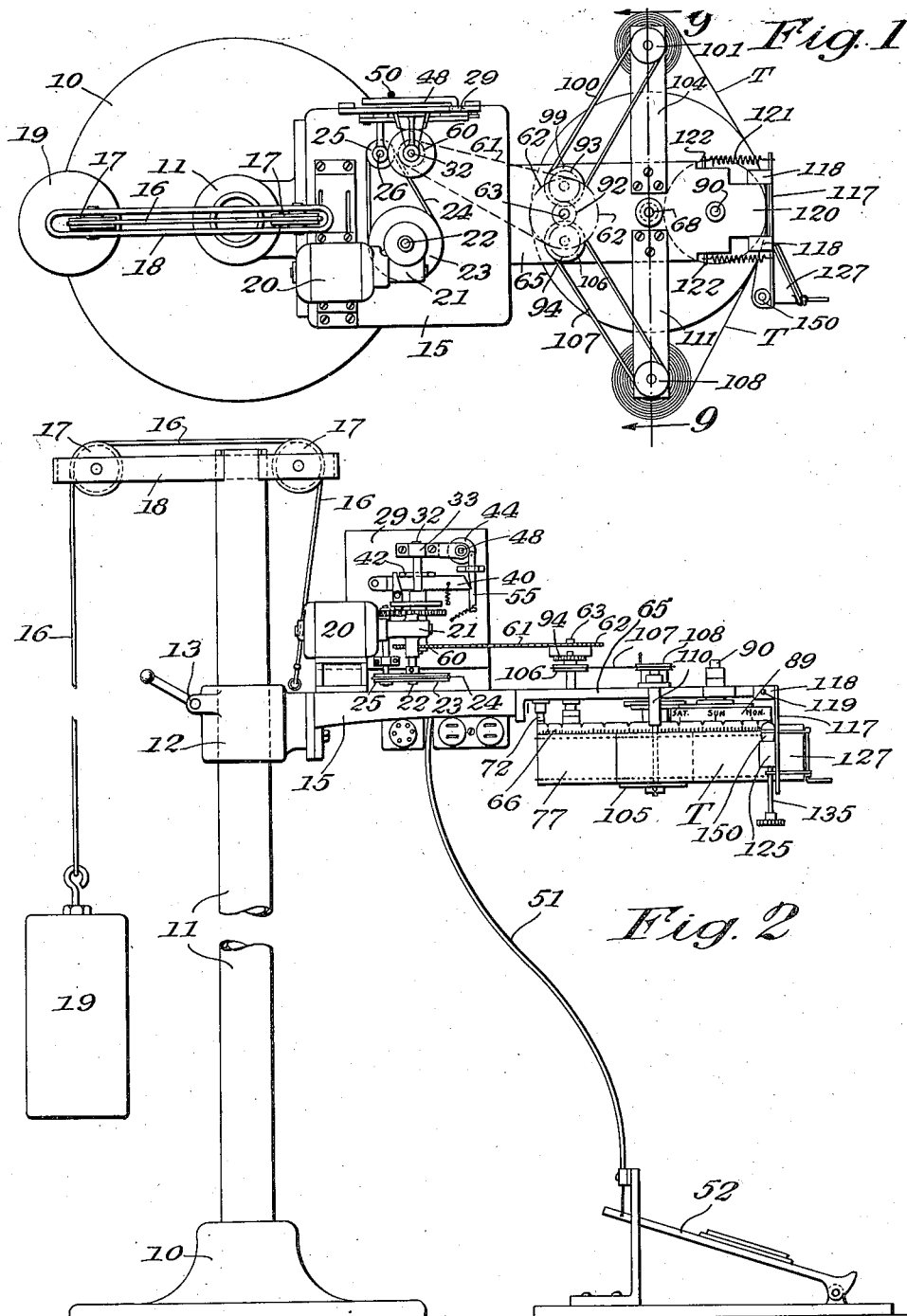

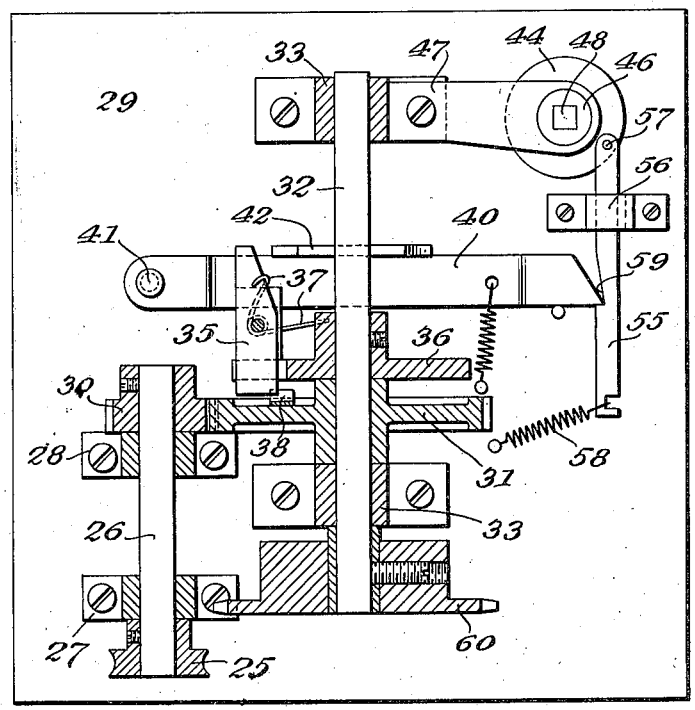
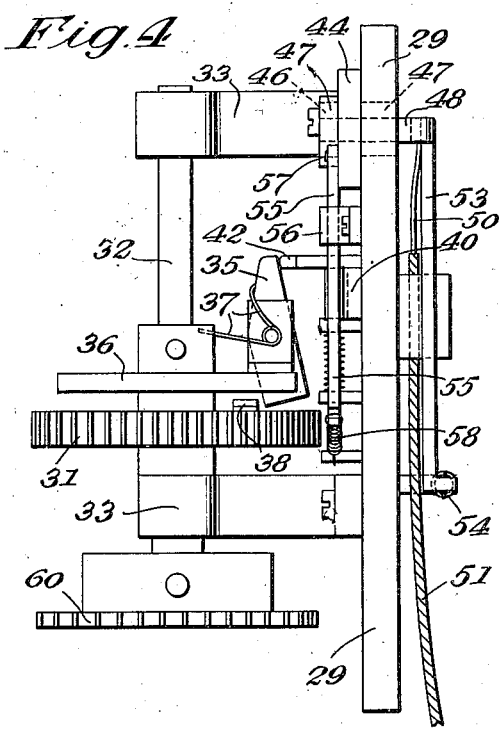
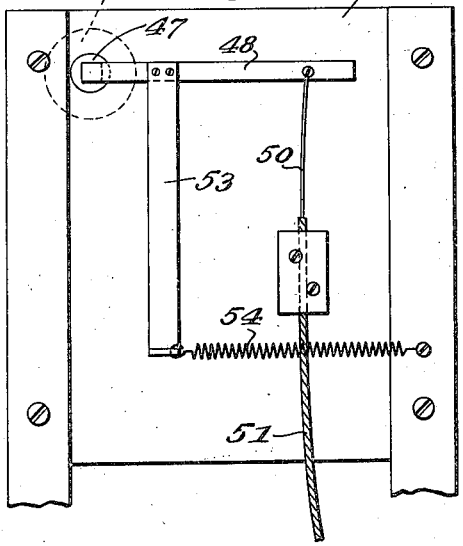

Inventor:
Louis F. Woodruff
By Dike, Calver and Gray
Attorneys.

Aug. 30, 1938.   L. F. WOODRUFF   2,128,446
DEVICE FOR DECODING RECORDS
Filed Aug. 3, 1937   5 Sheets-Sheet 4
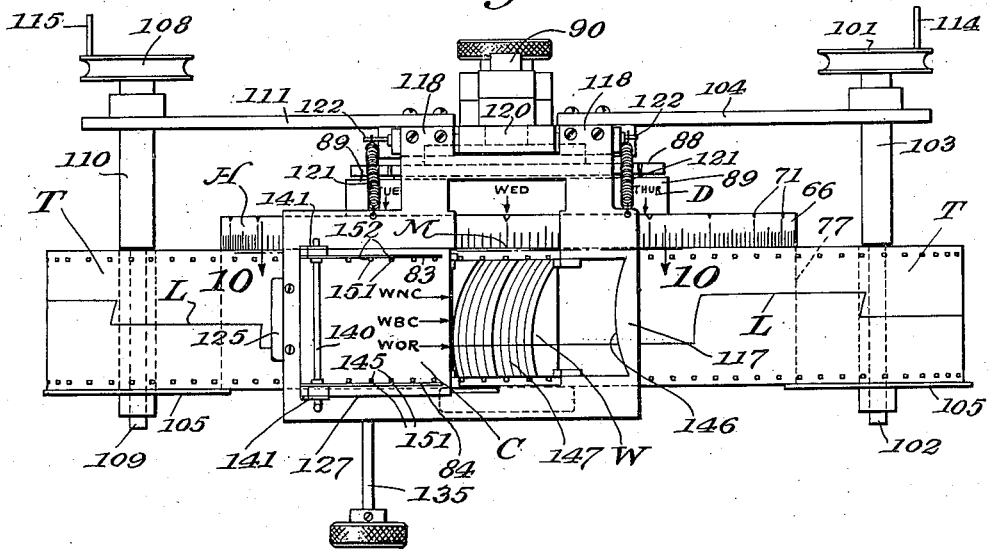
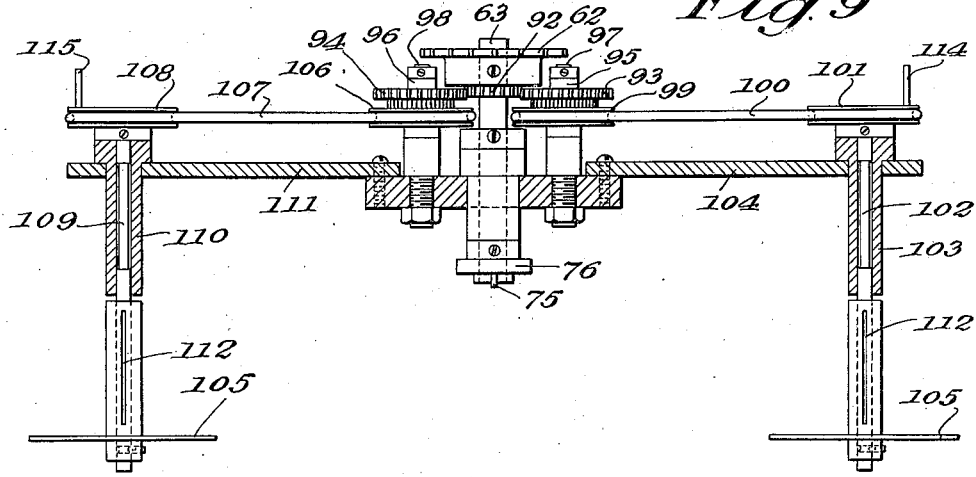
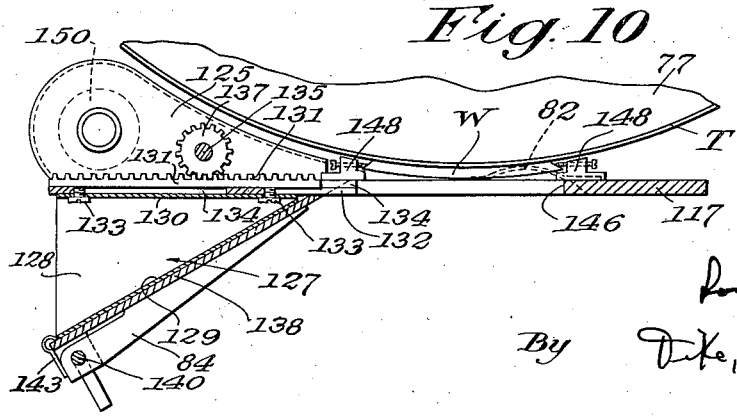
Inventor:
Louis F. Woodruff
By Dike, Calver and Gray
Attorneys

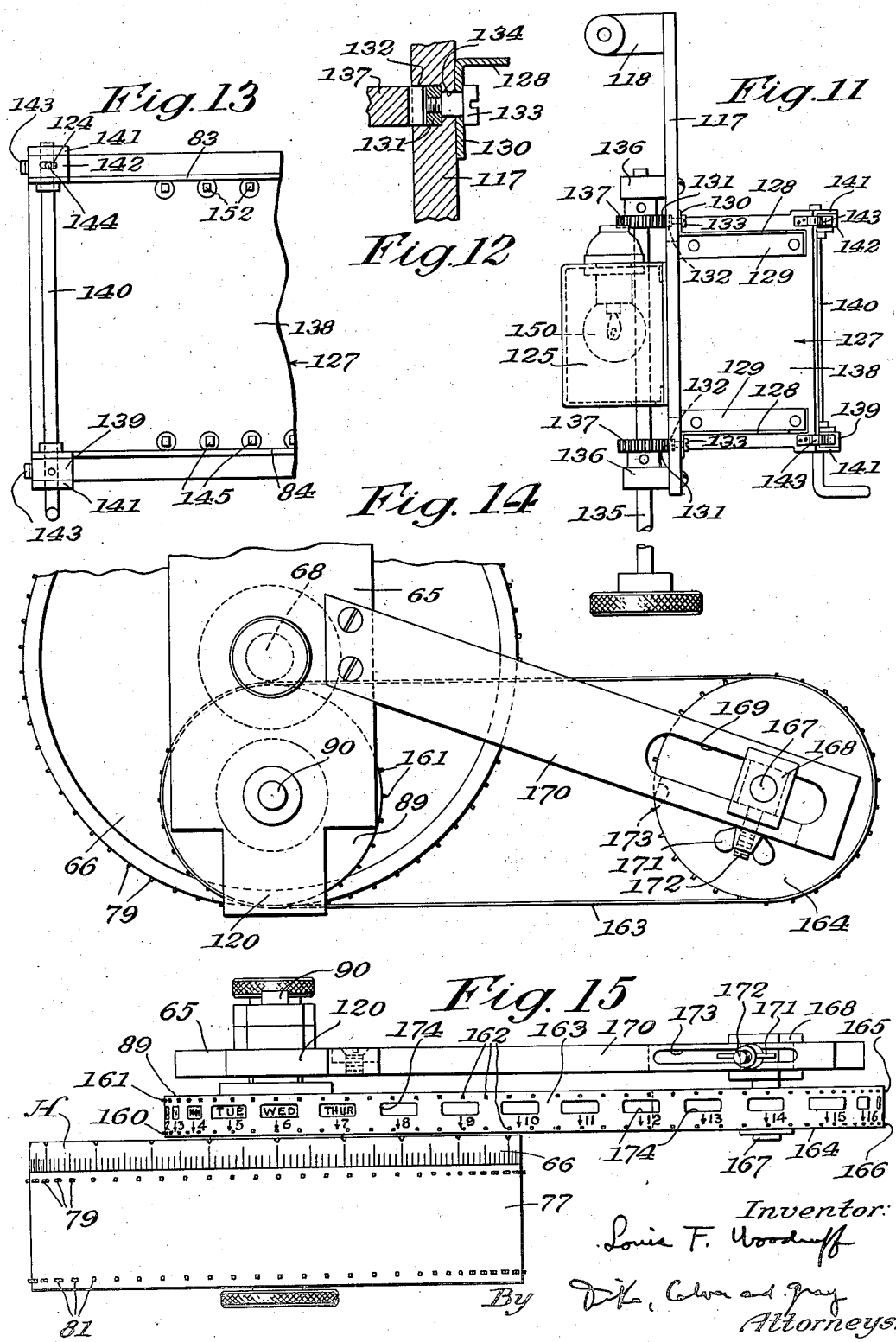

Patented Aug. 30, 1938

2,128,446

UNITED STATES PATENT OFFICE 2,128,446

DEVICE FOR DECODING RECORDS

Louis Frank Woodruff, Wellesley, Mass.

Application August 3, 1937, Serial No. 157,157

10 Claims. (Cl. 33—129)

The present invention has to do with graphic records which have been made by recording devices to record the conditions of operation of an apparatus or process over a desired period of time. In such recording devices, a record tape is moved at a desired rate while markings are formed on the tape representative of the conditions of operation. Such record tapes have been provided with pre-printed scale calibrations representative of time intervals and conditions of operation. The printing of such scale calibrations is expensive and some of this expense is a total loss because of waste of record tape which often cannot be avoided. Furthermore, the use of such printed record tape requires great care and accuracy and consequent loss of time in initially setting the tape in the recording device in order to avoid possibility of error. In my Patent No. 2,092,544, dated September 7, 1937, there is described a device making possible the use of unprinted record tape and the accurate interpretation and reading of records formed thereon.

It is an object of the present invention to provide an improved device of the general character described in my above mentioned co-pending application which may be conveniently and quickly operated to obtain accurate results.

The invention will be more clearly understood from the following description in conjunction with the accompanying drawings: in which, Fig. 1 is a plan view of an apparatus embodying the invention;

Fig. 2 is a side elevation view of the same;

Fig. 3 is a detail sectional side elevational view of a portion of the device;

Fig. 4 is a front elevational view of the portion of the device shown in Fig. 3;

Fig. 5 is a view of the structure shown in Fig. 4 as viewed from the right thereof;

Fig. 8 is a front elevational view of a portion of the device;

Fig. 9 is a sectional view taken on the line 9—9 of Fig. 1;

Fig. 10 is a sectional view taken on the line 10—10 of Fig. 8;

Fig. 11 is a detail view taken of a portion of the structure as viewed from the left of Fig. 8;

Fig. 12 is a detail sectional view of a portion of the structure shown in Fig. 11;

Fig. 13 is a detail front elevational view of a portion of the device;

Fig. 14 is a plan view, partly broken away, of a modified construction embodying the invention; and Fig. 15 is a front elevational view of the structure shown in Fig. 14.

Figure 6:
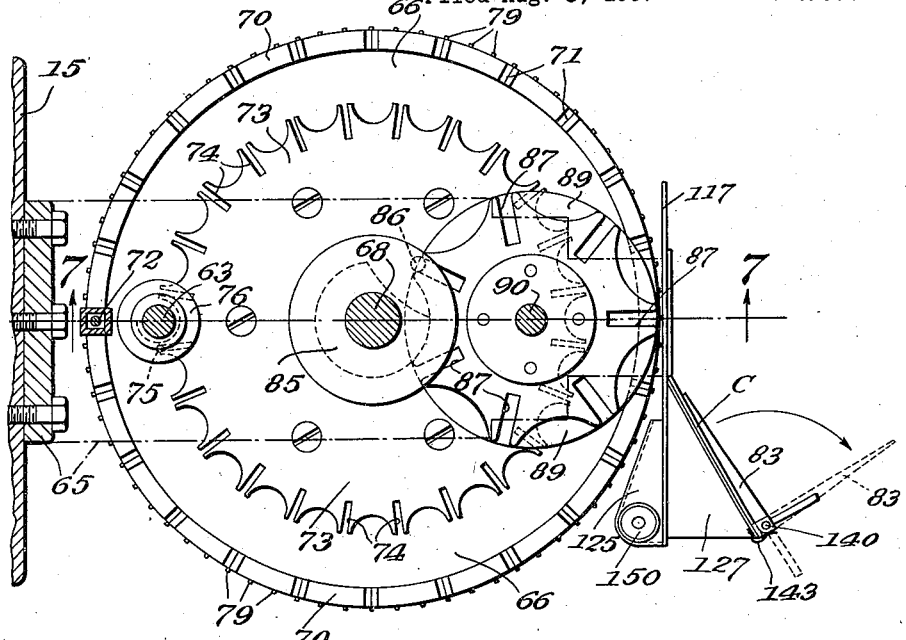
Fig. 6 is a sectional view taken on the line 6—6 of Fig. 7.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In the accompanying drawings there is illustrated a machine embodying the invention and comprising a frame having a base 10 (Figs. 1 and 2) which supports a vertical column 11. A sleeve 12 surrounds the column 11 and is adjustably positioned thereon by a clamp 13. A platform 15 is secured to the sleeve 12 and supports the principal elements of the mechanism of the invention. A cable 16 is secured at one end to the sleeve 12 and extends over a pair of pulleys 17 rotatably carried by an arm 18 fixed at the top of the column 11. A weight 19 is fixed upon the other end of the cable 16 to counterbalance the weight of the sleeve 12 and platform 15 together with the mechanism carried on the latter.

A reversible motor 20 is mounted upon the platform 15 and is supplied with electrical energy in any well known manner. The motor 20 is operatively connected through suitable gear reduction 21 with a rotatable shaft 22. A pulley 23 is fixed upon the shaft 22 and is operatively connected by a belt 24 with a pulley 25 fixed upon a shaft 26 which is rotatably carried in spaced bearings 27 and 28 (Fig. 3) mounted upon a bracket 29 secured upon one edge of the platform 15 and extending upward therefrom. A pinion 30 is fixed upon the shaft 26 and meshes with gear 31 (Figs. 3 and 4) rotatably mounted upon a shaft 32 which in turn is rotatably carried by bearings 33 fixed upon the bracket 29. A dog 35 is pivotally mounted upon a disk 36 and normally is urged by a spring 37 into a position to engage a lug 38 projecting upwardly from the top face of the gear 31. The disk 36 is suitably fixed upon the shaft 32 so that the latter is rotated when the dog 35 is engaged by the lug 38. An arm 40 is pivotally connected at one end to a stud 41 fixed upon the bracket 29. A cam 42 is fixed upon the arm 40 intermediate its ends so as to project laterally from the arm normally into the path of movement of the dog 35 so as to deflect the latter to a position out of the path of movement of the lug 38.

An arm 47 (Figs. 3, 4 and 5) is secured upon the bracket 29 so as to extend parallel thereto. A disk 44 is positioned between the bracket 29 and the arm 47 and is provided with bosses 46 and 45 which are rotatably received in bearings formed in the arm 47 and the bracket 29 respectively. A hole of square cross section extends through the disk 44 and the bosses 45 and 46 and is adapted to receive the bent end of a rod 48 of square cross section. One end of a flexible wire 50 is secured to the rod 48 near its free end. The flexible wire 50 is slidably mounted in a flexible conduit 51 and its other end is secured to a foot treadle 52. A laterally projecting arm 53 is secured to the rod 48 intermediate its ends and its free end is connected to one end of a spring 54 the other end of which is connected to the bracket 29. A bar 55 is slidably mounted in a guide 56 fixed upon the bracket 29 and is provided near one end with a bearing for rotatably receiving a pin 57 projecting from the face of the disk 44 near the periphery of the latter. The other end of the bar 55 is connected to one end of a spring 58, the other end of which is connected to the bracket 29. Intermediate its ends the bar 55 is provided with a notch 59 adapted to receive the free end of the arm 40.

Figure 7:
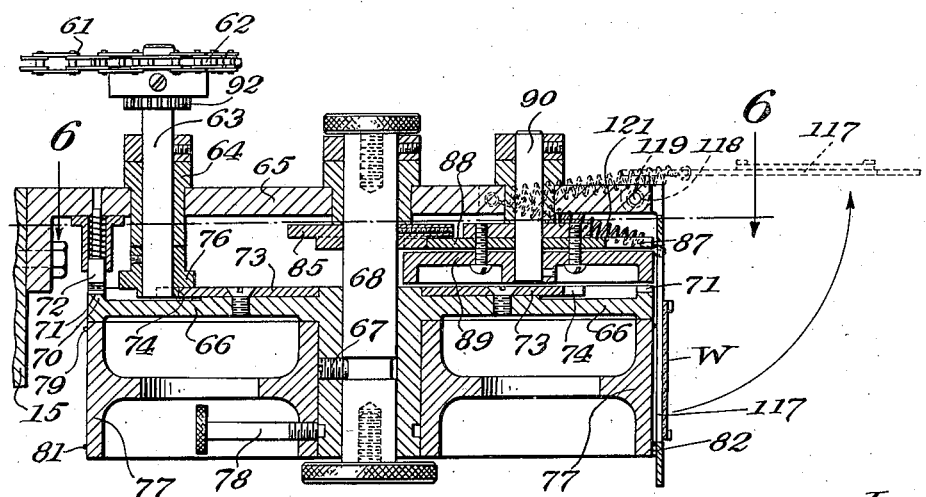
Fig. 7 is a sectional view taken on the line 7—7 of Fig. 6.

A sprocket 60 (Figs. 1 and 3) is fixed upon the shaft 32 and is operatively connected by a chain 61 to a sprocket 62 (Figs. 1, 6 and 7) fixed upon a shaft 63 mounted for rotation in a bearing 64 carried by a bracket 65 secured to and extending from the front end of the platform 15. The hub of a disk 66 is fixed by a set screw 67 upon a shaft 68 mounted for rotation in a suitable bearing carried by the bracket 65. The top face of the disk 66 is provided at its outer edge with an upwardly extending rib 70 having a plurality of equally spaced radially extending grooves 71 adapted to be engaged by a spring pressed detent 72. A ring 73 is secured upon the disk 66 and is provided at its outer periphery with a plurality of equally spaced radially extending slots 74 adapted to slidably receive a pin 75 extending downwardly from the lower face of a disk 76 fixed upon the shaft 63. Preferably twenty-four slots 74 are provided in the ring 73 so that the latter is rotated $\frac{1}{24}$ of a revolution for each revolution of the shaft 63. The periphery of the disk 66 is provided with a scale H having twenty-four main divisions representative of the hours in a day. Likewise, the rib 70 is provided with twenty-four grooves 71 any one of which may be engaged by the detent 72.

A drum 77 (Fig. 7) is adjustably fixed upon the hub of the disk 66 as by a set screw 78. A plurality of spaced teeth 79 and 81 are provided upon the periphery of the drum 77 adjacent the upper and lower edges thereof respectively so as to engage perforations 80 near the opposite edges of a record tape T. The teeth 79 are smaller than the teeth 81 so that the latter may engage the perforations 80 even if the distance between the rows of perforations changes due to expansion or contraction by humidity change.

A disk 85 is fixed upon the shaft 68 and is provided with a pin 86 depending from the lower face thereof and adapted to slidably engage one of the seven slots 87 extending radially from the outer edge of a ring 88 fixed upon a disk 89. The disk 89 is fixed upon a shaft 90 which is mounted for rotation in a bearing carried by the bracket 65. The periphery of the disk 89 is provided with a scale D representative of the days in a week. It will be noted that the disk 89 makes $\frac{1}{7}$ of a revolution for each revolution of the disk 66.

The shaft 63 is provided with a gear 92 (Figs. 7 and 9) adapted to mesh with gears 93 and 94 fixed upon sleeves 95 and 96 respectively, which are rotatably carried by stub shafts 97 and 98 fixed in the bracket 65. A pulley 99 is fixed upon the sleeve 95 and is operatively connected by a belt 100 with a pulley 101 fixed upon a shaft 102 rotatably mounted in a bearing 103 carried at the outer end of an arm 104 extending laterally from the bracket 65 and secured to the latter. A pulley 106 is fixed upon the sleeve 96 and is operatively connected by a belt 107 with a pulley 108 fixed upon a shaft 109 rotatably mounted in a bearing 110 carried near the outer end of an arm 111 projecting laterally from and secured to the bracket 65. Spools 105 for supporting convolutions of record tape T are detachably mounted upon the shafts 102 and 109. The hub of each spool is provided with a slot 112 in which the end of the tape T may be secured. The pulleys 101 and 108 are provided with crank handles 114 and 115 respectively so that the pulleys may be rotated to turn the shafts 102 and 109 to position the record tape T with respect to the calibrated scales H and D.

A plate 117 is provided with a pair of spaced ears 118 (Fig. 1, 2 and 7) extending rearwardly from its upper edge and pivotally supported upon a shaft 119 extending through and projecting from the opposite lateral edges of the reduced front end 120 of the bracket 65. Springs 121 are connected at one end to the plate 117 and are connected at their other ends to pins 122 carried by the bracket 65. A curved leaf spring 82 is secured to the plate 117 near its lower edge and is adapted to engage the tape T upon the drum 77. It will be noted that when the plate 117 is either in the full line position or the dotted line position shown in Fig. 7, the springs 121 will be on opposite sides of the shaft 119 and, consequently, will tend to hold the plate 117 in either of these positions.

The plate 117 is provided with an opening 146 (Figs. 8, 10 and 11) in which a window W of glass or other transparent material is positioned. The window is provided with a plurality of lines 147 which form continuations across the record tape T of the calibrations on the scales H and D. The window W is held in the opening 146 by a pair of fixtures 148. A housing 125 is positioned adjacent one end of the plate 117 and between the latter and the drum 77 and is secured to the plate by screws 126. A lamp 150 is mounted within the housing 125 and the latter is shaped so as to direct the rays of the lamp upon the window W.

A slide 127 (Figs. 8, 10 and 11) is slidably carried by the plate 117 and projects from the front face of the plate 117. The slide 127 comprises a pair of horizontally positioned and vertically spaced triangular shaped plates 128 each having an inturned flange 129 at its outer edge and an out-turned flange 130 at its inner edge. A rack 131 is slidably mounted in each of a pair of grooves 132 in the rear face of the plate 117 opposite the out-turned flanges 130. The racks 131 are secured to the flanges 130 by screws 133 passing through slots 134 in the plate 117. A vertically extending shaft 135 is rotatably mounted in suitable bearings 136 fixed to the rear face of the plate 117. A pair of pinions 137 are fixed upon the shaft 135 and engage the racks 131 to slidably move the latter together with the slide 127. A plate or inclined support 138 extends between the plates 128 and is suitably secured to the inturned flanges 129.

A rod 140 (Figs. 6, 10, 11 and 13) is rotatably mounted in bearings formed in ears 141 extending upwardly from the opposite edges of the plate 138. Blocks 139 and 142 are rotatably mounted upon the rod 140 adjacent the ears 141. A pair of leaf springs 143 are fixed to the plate 138 and extend upwardly so as to engage the blocks 139 and 142. Arms 83 and 84 are fixed to the blocks 139 and 142 respectively and are adapted to engage a calibration card C positioned upon the plate or inclined support 138. The block 139 is pinned to the rod 140 so as to rotate therewith and the rod 140 is provided with a pin 144 projecting into a slot 124 in the block 142 so that the arms 83 and 84 may be urged positively in engagement with the card C by the springs 143. On the other hand both arms 85 and 84 may be moved away from the card C by turning the rod 140.

The calibration card C is provided with a plurality of apertures 151 (Fig. 8) adjacent each of its horizontal edges adapted to engage teeth 145 and 152 provided near the lower and upper edges respectively of the plate 138. The teeth 145 are positioned in the same horizontal plane as the teeth 81 (Fig. 7) on the drum 77 so as to position the lower edge portion of the calibration card C in a predetermined position relative to the lower edge portion of the record tape T. The teeth 152 are smaller than the teeth 145 so that they may engage the apertures adjacent the upper edge of the card C regardless of any change in the distance between the aperture adjacent the upper and lower edges of the card C due to expansion and contraction caused by humidity changes.

The record tape T bears a record line L formed thereon in a device, such as that described in a copending application of Robert F. Elder and Louis F. Woodruff, Serial No. 96,350, filed August 17, 1936, for recording the radio listening habits of users of radio receiving sets. In that device the record tape T is caused to travel at a uniform desired rate at all times and the device is provided with a stylus which is brought in engagement with the record tape each time the radio receiving set is tuned to a broadcasting station. The position of a given point on the record line L transverse of the record tape depends upon the broadcasting station at which the radio receiving set was tuned at the particular time. The record tape T is also provided with a marking M together with the time and date which indicates a point under the stylus on the record tape at the time the record tape started its motion in the device in the radio receiving set.

In the device of the present invention the calibration card C is provided with markings which indicate the transverse positions on the record tape T which correspond to broadcasting stations in which the operator is interested.

When power is supplied to the motor 20, the shaft 26 and the gear 31 (Figs. 3 and 4) are continuously rotated. However, when the foot treadle 52 is in its raised position as shown in Fig. 2, the drum 77 and the discs 66 and 89 are held stationary and the dog 35 is positioned as indicated in Fig. 4. When the foot treadle 52 is depressed, the rod 48 and the disc 44 (Fig. 3) are rotated to move the slide 55 which turns the arm 40 to carry the cam 42 out of engagement with the dog 35. This permits the spring 37 to restore the dog 35 to the position shown in Fig. 3 and in the path of movement of the lug 38 carried by the continuously rotating gear 31. When the dog 35 is in the position shown in Fig. 3, the shaft 32 is rotated continuously and transmits its motion through the chain 61 to rotate the shaft 63 (Figs. 2, 6, 7 and 9).

If the treadle is depressed to cause rotation of the shaft 63 and the treadle is then immediately released, the shaft 63 will continue to rotate until the dog 35 engages the cam 42. Engagement of the dog 35 with the cam 42 moves the former out of the path of movement of the lug 38 and, consequently, stops rotation of the shaft 32 after it has completed one revolution. The sprockets 60 and 62 (Figs. 1 and 2) are the same size and, consequently, the shaft 63 rotates one complete revolution while the shaft 32 is making one revolution. During a revolution of the shaft 63, the pin 75 engages one of the slots 74 and moves the disc 66 and scale H $\frac{1}{24}$ of a revolution, that is, moves the scale H a distance corresponding to a one hour graduation. As the disc 66 stops, the detent 72 engages one of the grooves 71. If, however, the foot treadle 52 is maintained in its depressed position, the shafts 32 and 63 will rotate continuously and the disc 66 will move step by step. As the disc 66 completes each revolution, it will cause the disc 89 to move $\frac{1}{7}$ of a revolution or cause the scale D thereon to move a distance corresponding to a graduation representative of one day of a week.

In using the device the record tape T is positioned in the device so that the point M (Fig. 8) on the tape is opposite the time representation on the scales H and D corresponding to the time the record on the tape was started. The device is then actuated as previously described to move the record tape and the scales H and D which may be stopped when the marking on the tape indicates a change of broadcasting station so that a desired notation thereof may be made. In order to facilitate the accurate interpretation of the record upon the tape T, the calibration card C is mounted upon the inclined support 138 so that its edge may be brought close to the surface of the record tape. The slide 127 may be moved upon the plate 117 by turning the shaft 135 to bring the edge of the calibration card C in close proximity to the point on the record tape T being examined. Furthermore, the markings 147 upon the window W greatly facilitate the accurate examination of the record upon the tape T especially where the markings are curved as indicated in the accompanying drawings. The markings 147 as illustrated in the accompanying drawings are curved because the stylus which made the record on the record tape was arranged to move transversely of the tape along a path such as indicated by the markings 147. The arrangement is such that as the scales H and D and the tape T are moved step by step, the hour markings on the scale H are brought opposite the first curved marking 147 at the left on the window W as viewed in Fig. 8.

The largest time units represented on the device above described are the day markings upon the scale D which is provided with seven which are representative of the seven days in a week. If it is desired to interpret a record upon a record tape made over a period greater than one week, the apparatus of the invention may be modified as illustrated in Figs. 14 and 15. In the structure illustrated in Figs. 14 and 15 some of the parts are identical to those disclosed in the remaining figures of the drawings and are represented by the same reference characters. In the modified construction teeth 160 and 161 are provided adjacent the lower and upper edges respectively of the periphery of the disk 89 adapted to engage apertures 162 at the opposite edges of an endless belt or scale 163. The belt 163 passes around a drum 164 provided at its upper and lower edges with teeth 165 and 166 respectively adapted to engage the apertures at the edges of the belt 163. The drum 164 is rotatably mounted upon a stub shaft 167 fixed in a block 168 fitted in a slot 169 near one end of an arm 170 the other end of which is suitably secured upon the bracket 65. The block 168 is held in a desired position in the slot 169 by a nut 171 threaded upon a bolt 172 carried by the block and projecting through a slot 173 in the arm 170. If desired, the belt 163, instead of being provided with scale markings representative of days, may be provided with apertures 174 adapted to be brought opposite such scale markings upon the scale D. The belt 163 may be provided with numbers opposite the apertures which will be representative of the days of the month. The length of the endless belt or scale 163 will be dependent upon the particular month represented, that is, whether it is a twenty-eight day month, such as February, or a month having thirty or thirty-one days.

I claim:

1. In a device for facilitating the reading of records on a record tape and having a movable carrier for moving a record tape, a scale having representations of time units movable adjacent said tape, and means for moving said tape and scale to bring corresponding points thereon simultaneously adjacent a given location, the combination therewith of a plate adapted to be positioned opposite said tape and scale and having an opening opposite said tape and scale at and adjacent said location, a transparent window in said opening opposite said tape and having markings forming continuations of said time representations across said tape, and a calibration scale carried by said plate.

2. In a device for facilitating the reading of records on a record tape and having a movable carrier for moving a record tape, a scale having representations of time units movable adjacent said tape, and means for moving said tape and scale to bring corresponding points thereon simultaneously adjacent a given location, the combination therewith of a plate adapted to be positioned opposite said tape and scale and having an opening opposite said tape and scale at and adjacent said location, a support carried by said plate, means for positioning a calibration scale on said support, means providing an indication visible through said opening of continuations of said time representations across said tape, and means for adjusting the position of said support to bring said calibration scale to a position opposite said opening in desired relation to any point along any one of said visible continuations.

3. In a device for facilitating the reading of records on a record tape and having a movable carrier for moving a record tape, a scale having representations of time units movable adjacent said tape, and means for moving said tape and scale to bring corresponding points thereon simultaneously adjacent a given location, the combination therewith of a plate adapted to be positioned opposite said tape and scale and having an opening opposite said tape and scale at and adjacent said location, a transparent window in said opening opposite said tape and having markings forming continuations of said time representations across said tape, a support carried by said plate, means for positioning a calibration scale on said support, and means for adjusting the position of said support to bring said calibration scale to a desired position in relation to any point along any one of said markings.

4. In a device for facilitating the reading of records on a record tape and having a movable carrier for moving a record tape, a scale having representations of time units movable adjacent said tape, and means for moving said tape and scale to bring corresponding points thereon simultaneously adjacent a given location, the combination therewith of a plate adapted to be positioned opposite said tape and scale and having an opening opposite said tape and scale at and adjacent said location, a support carried by said plate, means for positioning a calibration scale on said support, means providing an indication visible through said opening of continuations of said time representations across said tape, means for adjusting the position of said support to bring said calibration scale to a position opposite said opening in desired relation to any point along any one of said visible continuations, and means on said carrier and support adapted to cooperate with corresponding edge portions of said tape and calibration scale to position said edge portions in predetermined relative positions.

5. In a device for facilitating the reading of records on a record tape and having a movable carrier for moving a record tape, a scale having representations of time units movable adjacent said tape, and means for moving said tape and scale to bring corresponding points thereon simultaneously adjacent a given location, the combination therewith of a plate adapted to be positioned opposite said tape and scale and having an opening opposite said tape and scale at and adjacent said location, a transparent window in said opening opposite said tape and having markings forming continuations of said time representations across said tape, a support slidably carried by said plate, a calibration scale, and means on said carrier and support adapted to cooperate with corresponding edge portions of said tape and calibration scale to position said edge portions in predetermined relative positions.

6. In a device for facilitating the reading of records on a record tape and having a movable carrier for moving a record tape, a scale having representations of time units movable adjacent said tape, and means for moving said tape and scale to bring corresponding points thereon simultaneously adjacent a given location, the combination therewith of a plate adapted to be positioned opposite said tape and scale at and adjacent said location, a support on said plate adapted to receive a calibration scale, a pair of relatively movable arms adapted to engage and hold said scale upon said support, resilient means for urging said arms toward said support, and means for moving said arms away from said support.

7. In a device for facilitating the reading of records on a record tape and having a movable carrier for moving a record tape, a scale having representations of time units movable adjacent said tape, and means for moving said tape and scale to bring corresponding points thereon simultaneously adjacent a given location, the combination therewith of a plate adapted to be positioned opposite said tape and scale and having an opening opposite said tape and scale at and adjacent said location, a support on said plate having an inclined surface adapted to support a calibration scale adjacent said opening, and means for positioning a calibration scale on said surface to bring an edge of said scale adjacent said opening.

8. In a device for facilitating the reading of records on a record tape and having a movable carrier for moving a record tape, a scale having representations of time units movable adjacent said tape, and means for moving said tape and scale to bring corresponding points thereon simultaneously adjacent a given location, the combination therewith of a plate adapted to be positioned opposite said tape and scale and having an opening opposite said tape and scale at and adjacent said location, means providing an indication visible through said opening of continuations of said time representations across said tape, a support carried by said plate and having an inclined surface, means for positioning a calibration scale on said surface to bring an edge of said scale adjacent said opening, and means for adjusting the position of said support to bring said calibration scale to a position opposite said opening in desired relation to any point along any one of said visible continuations.

9. A device for facilitating the reading of records on a record tape comprising a movable carrier for moving a record tape, a member movable adjacent said tape and having representations of time subunits thereon, an endless scale having representations of time units thereon, a pair of wheels operatively associated with said scale for moving the same, and mechanism operatively connecting said carrier and member and one of said wheels whereby said units and subunits of time representation are brought successively adjacent a given location at the same time as corresponding points on said record tape which are spaced a distance equal to the distance of travel of the tape in such represented time during the making of the record on the tape.

10. A device for facilitating the reading of records on a record tape comprising a movable carrier for moving a record tape, a member movable adjacent said tape and having representations of time subunits thereon, a wheel having a scale with representations of time units thereon, mechanism operatively connecting said carrier and member and a wheel whereby said units and subunits of time representation are brought successively adjacent a given location at the same time as corresponding points on said record tape which are spaced a distance equal to the distance of travel of the tape in such represented time during the making of the record on the tape, and means operable to cause said device to operate step by step to bring said subunits successively to said location.

LOUIS FRANK WOODRUFF.